United States Patent [19]

Hayashi et al.

[11] Patent Number: 5,228,382
[45] Date of Patent: Jul. 20, 1993

[54] AUTOMATIC FOODSTUFF VENDING AND COOKING APPARATUS FOR PRODUCING NOODLES AND THE LIKE FOODSTUFFS

[75] Inventors: Atsuo Hayashi; Mitsuo Shimada, both of Moriguchi, Japan

[73] Assignee: Sanyo Electric Co., Ltd., Moriguchi, Japan

[21] Appl. No.: 768,200

[22] PCT Filed: Feb. 21, 1991

[86] PCT No.: PCT/JP91/00221

§ 371 Date: Oct. 24, 1991

§ 102(e) Date: Oct. 24, 1991

[30] Foreign Application Priority Data

Feb. 26, 1990 [JP] Japan .................................. 2-44756
Mar. 1, 1990 [JP] Japan .................................. 2-50650
Mar. 9, 1990 [JP] Japan .................................. 2-58648
Apr. 10, 1990 [JP] Japan .................................. 2-95909

[51] Int. Cl.$^5$ .................................................. A47J 27/10
[52] U.S. Cl. ............................................... 99/328; 99/334; 99/339; 99/355; 99/357; 99/404; 99/407
[58] Field of Search ................................. 99/334–337, 99/330, 331, 339, 353, 355, 357, 342, 403, 404, 407, 416, 484, 516, 470, 326–328; 426/451, 523, 557; 221/150 R, 150 A, 150 HC

[56] References Cited

U.S. PATENT DOCUMENTS

| | | | |
|---|---|---|---|
| 4,030,632 | 6/1977 | Harashima | 221/150 A |
| 4,438,683 | 3/1984 | Bartfield | 99/330 |
| 4,619,189 | 10/1986 | Koy | 99/334 |
| 4,685,386 | 8/1987 | Bezon | 99/407 |
| 4,732,080 | 3/1988 | Vita | 99/404 |
| 4,803,916 | 2/1989 | Tacconi | 99/352 |
| 4,821,633 | 4/1989 | Ripatonda | 99/357 |
| 4,869,160 | 9/1989 | Pratolongo | 99/403 |
| 4,945,826 | 8/1990 | Ripatonda | 99/352 |
| 4,979,435 | 12/1990 | Hayashi et al. | 221/150 HC |
| 5,010,806 | 4/1991 | Narcisi et al. | 99/357 |

FOREIGN PATENT DOCUMENTS

0285492 11/1990 Japan .................................. 99/357

Primary Examiner—Timothy F. Simone
Attorney, Agent, or Firm—Armstrong, Westerman, Hattori, McLeland & Naughton

[57] ABSTRACT

An automatic foodstuff cooking apparatus for automatically processing and cooking a foodstuff wherein the automatic foodstuff cooking apparatus includes a cooking chamber which is arranged in the region between a receiving unit and a takeout unit both of which are located on the front side of the apparatus is disclosed. The front surface of the cooking chamber is covered with a transparent panel. A first cooking unit is arranged on the receiving unit side of the cooking chamber and a second cooking unit is arranged on the takeout unit side. In addition, at least one foodstuff producing unit is arranged on the rear side of the first cooking unit. With such construction, the apparatus is not required to employ any cook for operating the apparatus, and moreover, manpowers required for removing dirty dishes, bowls or the like after completion of a cooking operation can be eliminated. Additionally, the apparatus can be designed and constructed in smaller dimensions. Thus, the apparatus of the present invention can advantageously be employed for an automatic vending machine or the like.

4 Claims, 11 Drawing Sheets

AUTOMATIC FOODSTUFF VENDING AND COOKING APPARATUS FOR PRODUCING NOODLES AND THE LIKE FOODSTUFFS

TECHNICAL FIELD

The present invention relates to an automatic foodstuff cooking apparatus for producing a foodstuff in the form of noodles such as wheat noodles, buckwheat noodles, spaghetti, chinese noodles or the like by cooking it.

BACKGROUND ART

A noodle cooking apparatus as disclosed in an official gazette of Japanese Unexamined Patent Publication (Kokai) NO. 60-172264 can be noted as a prior invention which has been invented prior to filing of the present patent application. This prior apparatus is constructed such that a block of plain noodle is produced by mixing flour with water and kneading a mixture of flour and water, it is then flattened and slit to form longitudinally extending noodles which in turn are boiled and cooked using hot water, and the cooked noodles are finally received in a receptacle so that a product of cooked foodstuff is delivered to a customer.

However, since the conventional noodle cooking apparatus is operated at every time when a foodstuff in the form of noodles is to be prepared and produced, there arises a problem that manpower is required for removing dirty dishes, bowls or the like after completion of a cooking operation.

In view of the foregoing problem, the present invention is intended to provide an automatic foodstuff cooking apparatus in the form of an automatic foodstuff cooking/vending apparatus which assures that a foodstuff can automatically be produced by a customer's purchasing operation, a customer can visually confirm a series of cooking steps, and moreover, the apparatus can be designed and constructed in smaller dimensions.

In addition, with respect to the conventional apparatus constructed in the above-described manner, noodles are received in an elongated basket of which upper surface is opened and exposed to the outside so that they are conveyed further while they are held in the basket. Thus, when the noodles are to be discharged to a subsequent cooking step during a conveying operation, the noodles in the basket can not be taken out therefrom unless the basket is reversed. For this reason, other problems are that it is difficult to mechanize a takeout operation of the noodles from the basket and the noodles in the basket can be taken out therefrom only by utilizing operator's manpower.

Therefore, the present invention is intended to provide an automatic foodstuff cooking apparatus which assures that a foodstuff received in a basket can easily be conveyed to a subsequent cooking step.

Additionally, the present invention is intended to provide an automatic foodstuff cooking apparatus which assures that a foodstuff received in a basket can easily be delivered to a receptacle, and moreover, undesirable invasion of unnecessary water drops into the receptacle can be prevented reliably.

With respect to the conventional automatic cooking/vending apparatus as described above, since boiling water in a boiling water bath is normally held in the boiling state by activating a heating unit so as to enable noodles to be boiled in the boiling water bath at all times, a quantity of vaporization of the boiling water is unavoidably increased. This leads to problems that the boiling water bath should frequently be supplemented with hot water, causing the working temperature of the boiling water in the boiling water bath to be reduced at every time of additional supplement of hot water. Since the boiling water in the boiling water bath should be maintained at the boiling temperature of hot water at all times, there arises another problem that a quantity of energy consumed by the heating unit is increased undesirably.

The present invention has been made in consideration of the foregoing background and its object resides in providing an automatic foodstuff cooking apparatus in the form of an automatic cooking/vending apparatus including a controlling unit for properly controlling a temperature of hot water for boiling a foodstuff wherein a quantity of vaporization of boiling water for boiling the foodstuff can be reduced, a quantity of consumption of the boiling water can be reduced, and moreover, a quantity of energy consumed by a heating unit can be reduced.

DISCLOSURE OF THE INVENTION

According to one aspect of the present invention, there is provided an automatic foodstuff cooking apparatus for automatically processing and cooking a foodstuff, wherein the automatic foodstuff cooking apparatus includes a receiving unit for issuing an order card when a monetary medium such as a coin, a card or the like is received by the receiving unit, at least one foodstuff producing unit for processing and cooking the foodstuff in operative association with actuation of the receiving unit, a first cooking unit for cooking a foodstuff produced by the foodstuff producing unit, a second cooking unit for additionally cooking the foodstuff after it is cooked in the first cooking unit, a receptacle delivering unit for delivering a receptacle so as to allow the foodstuff cooked in the second cooking unit to be received in the receptacle, a stocker unit for storing cooked foodstuffs each received in the receptacle, and a takeout unit for discharging to a takeout port a certain foodstuff corresponding to the kind of foodstuff designated by insertion of the order card while displaying preparation of foodstuffs each received in the receptacle and stored in the stocker unit, and wherein the automatic foodstuff cooking apparatus further includes a cooking chamber which is arranged between the receiving unit and the takeout unit, a front surface of the cooking chamber being covered with a transparent panel. The first cooking unit is located on the receiving unit side of the cooking unit, the second cooking chamber is located on the takeout unit side of the cooking chamber and the foodstuff producing unit is located on the rear side of the first cooking unit.

With the automatic foodstuff cooking apparatus of the present invention constructed in the above-described manner, when a monetary medium such as a coin, a card or the like are received by the receiving unit, the latter issues an order card thereby to drive the food producing unit. As the food producing unit is driven in this way, a foodstuff is produced. The produced foodstuff is first cooked in the first cooking unit and it is additionally cooked in the second cooking unit. After completion of the cooking operation, the foodstuff is received in one of receptacles arranged in a receptacle delivering unit and it is then stored in the stocker unit. Each foodstuff stored in the stocker unit is identified by a displaying operation performed by the takeout unit. Thus, after an order card is inserted in the receiving unit by a customer, the kind of foodstuff corresponding to the order card is delivered to a takeout port from which the customer can take out his ordered foodstuff. After the customer inserts his monetary medium into the receiving unit, he can successively visually observe from the receiving unit side a series of processing/cooking steps to be practiced in the respective units in the cooking chamber, through a transparent panel. Finally, he can take out his ordered foodstuff from the takeout unit which is located at the rearmost end of the automatic foodstuff cooking apparatus.

In addition, according to other aspect of the present invention, there is provided a foodstuff discharging unit employable for an automatic foodstuff cooking apparatus for automatically processing and cooking a foodstuff, wherein the foodstuff discharging unit includes a plurality of baskets each adapted to receive a foodstuff and then convey the foodstuff further, each of the baskets having a bottom portion which is opened when the foodstuff is to be discharged therethrough, an elevator unit for successively raising up the baskets, a forwardly/rearwardly displaceable chute adapted to be displaced to a position below the basket when the latter is raised up by the elevator unit, and a thrust unit for discharging each foodstuff received by the basket by opening the bottom portion of the basket which has been raised up by the elevator unit.

With the foodstuff discharging unit of the present invention constructed in the above-described manner, when the basket having a certain foodstuff received therein is displaced to a predetermined position, it is raised up by actuating the elevator unit. As the basket is raised up in this way, the discharge chute is displaced forwardly to the position below the basket, whereby the thrust unit is actuated to open the bottom portion of each basket. Thus, the foodstuff received in the basket is discharged onto the discharge chute which in turn serves to discharge the foodstuff to a subsequent cooking step.

Additionally, according to another aspect of the present invention, there is provided a foodstuff discharging unit employable for an automatic foodstuff cooking apparatus for automatically processing and cooking a foodstuff, wherein the foodstuff discharging unit includes a plurality of baskets each adapted to receive a foodstuff and then convey the foodstuff further, each of the baskets having a bottom portion which is opened when the foodstuff is to be discharged therethrough, an opening/closing mechanism for opening the bottom portion of each basket, the opening/closing mechanism including a discharge chute for guiding the displacement of each foodstuff discharged from the basket to a receptacle, and a receiving tray member adapted to be displaced to a position below the discharge chute in operative association with the opening/closing mechanism, the receiving tray member being displaced away from the position below the discharge chute while the bottom portion of each basket is kept opened, and moreover, the receiving tray member being displaced to the position below the discharge chute to receive therein water drops falling down from the opening/closing mechanism while the automatic foodstuff cooking apparatus is held in the sale waiting state.

With the foodstuff discharging unit of the present invention constructed in the above-described manner, when the opening/closing mechanism is actuated to open the bottom portion of the basket, the discharge chute receives the foodstuff discharged through the bottom portion of the basket and then conveys it to a receptacle located below the discharge chute. At this time, the receiving tray member operatively associated with the opening/closing mechanism is retracted away from the position below the discharge chute so as not to obstruct discharging of the foodstuff from the discharge chute to the receptacle. After the bottom portion of the basket is fully opened by actuation of the opening/closing mechanism, the receiving tray member is displaced forwardly to reach the position below the opening/closing mechanism, whereby water drops falling down from the opening/closing mechanism are received in the receiving tray member.

Moreover, according to further another aspect of the present invention, there is provided a boiling temperature controlling unit employable for an automatic foodstuff cooking apparatus in the form of an automatic cooking/vending apparatus for automatically cooking and vending a foodstuff by preparing the foodstuff in response to a sale command generated by a customer's foodstuff purchasing operation and then boiling the food stuff in a foodstuff boiling bath, wherein the boiling temperature controlling unit includes a heating unit for heating boiling water in the boiling bath, a temperature sensor for detecting a temperature of the boiling water in the foodstuff boiling bath, and a controlling unit for controlling the heating unit so as to allow the heating unit to operate properly. Specifically, a controlling operation is performed by the controlling unit such that the heating unit is controlled so as to allow a temperature of the boiling water in the boiling water bath to remain within the range of a warming-up temperature lower than a boiling temperature of hot water in the boiling water bath by a predetermined quantity of temperature in response to a temperature signal from the temperature sensor while the automatic foodstuff cooking apparatus is held in the sale waiting state, and moreover, the heating unit is controlled so as to allow a temperature of the boiling water in the boiling water bath to be equalized to the boiling temperature of hot water during a foodstuff boiling operation in response to a sale command generated by a customer's foodstuff purchasing operation.

With the boiling temperature controlling unit of the present invention constructed in the above-described manner, while the automatic foodstuff cooking apparatus is held in the sale waiting state, the controlling unit controls the heating unit so as to allow a temperature of the boiling water in the boiling water bath to remain within the range of a warming-up temperature lower than the boiling temperature of hot water by a predetermined quantity of temperature in response to a temperature signal from the temperature sensor. In addition, the controlling unit controls the heating unit so as to allow a temperature of the boiling water in the boiling water bath to be equalized to the boiling temperature of hot water during a foodstuff boiling operation in response to a sale command generated by a customer's purchasing operation.

BRIEF DESCRIPTION OF THE DRAWINGS

The accompanying drawings schematically illustrate an automatic foodstuff cooking apparatus in accordance with an embodiment of the present invention, wherein.

BEST MODE FOR CARRYING OUT THE INVENTION

Figure 1:
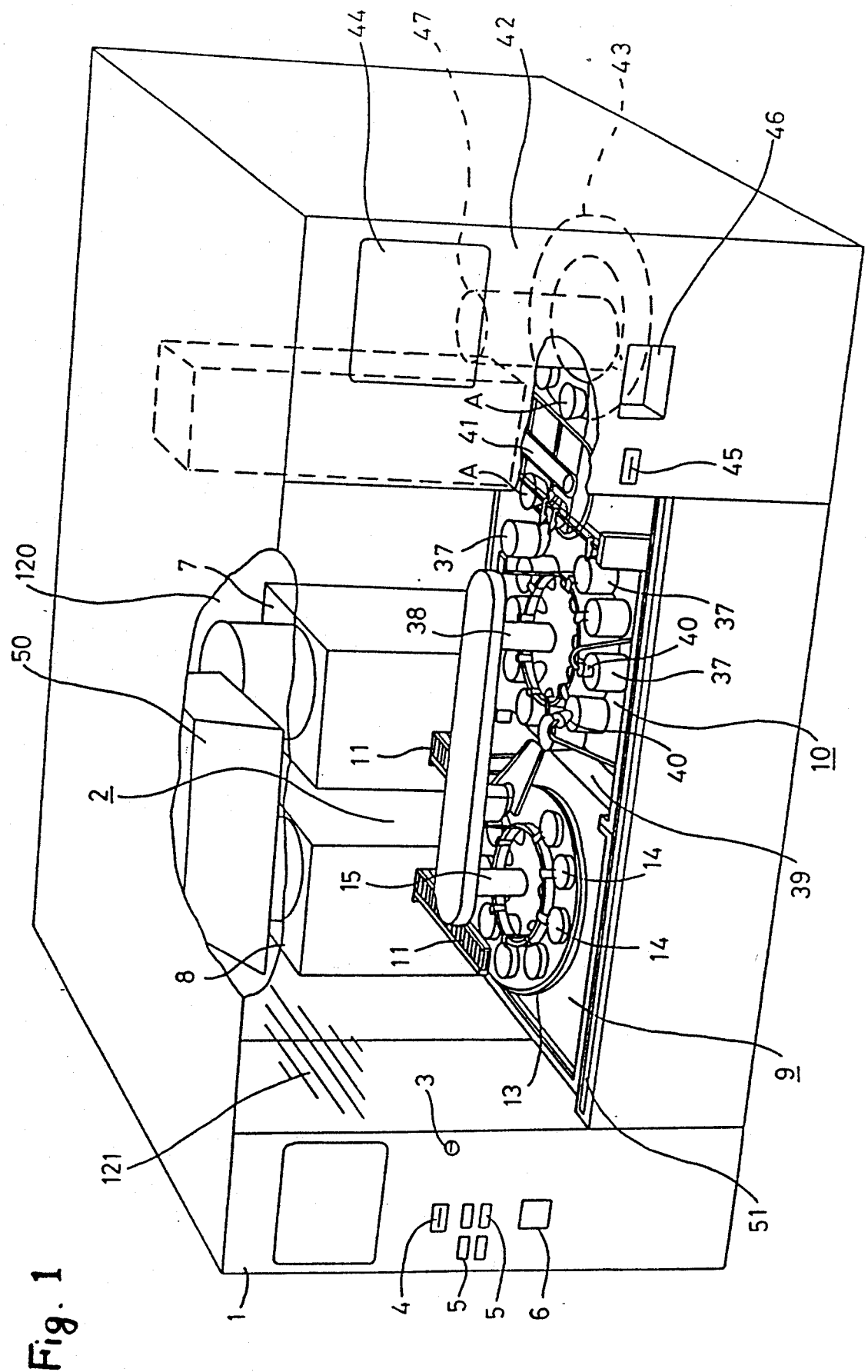
FIG. 1 is a perspective view of the automatic foodstuff cooking apparatus.
Figure 2:
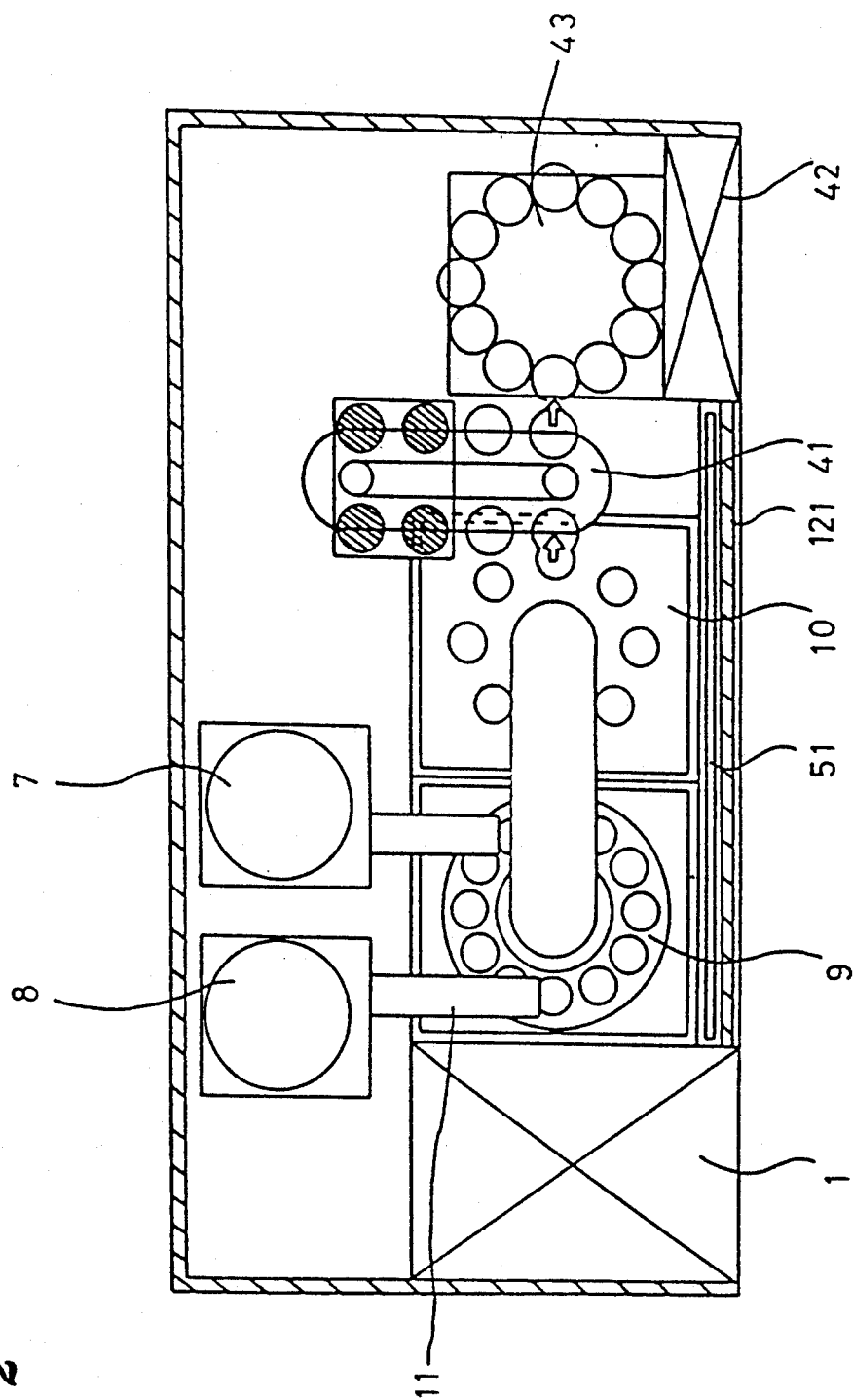
FIG. 2 is an exploded sectional plan view of the automatic foodstuff cooking apparatus, particularly illustrating the structure of the same.

The accompanying drawings illustrates an automatic foodstuff cooking apparatus in accordance with an embodiment of the present invention.

Reference numeral 1 designates a receiving unit serving as receiving means for issuing an order receipt card and transmitting a sale command to a processing/cooking unit 2 when a monetary medium such as a coin, a note, a card or the like inserted by a customer is received thereby and a selecting operation is then performed for noodles to be sold. A coin insert slit 3, a card or note insert slit 4, a plurality of selection buttons 5 each allocated to noodles to be sold and a card sale port 6 for issuing an order receipt card for noodles to be sold are arranged on the front surface of the receiving unit 1.

In detail, when a coin, a note, a card or their combination having a monetary value corresponding to a predetermined price required for purchasing a certain commodity are inserted through the coin insert slit 3 or the note or card insert slit 4, the receiving unit 1 is activated so as to enable a commodity to be purchased by a customer to be selected. Subsequently, when the customer selectively depresses one of the selection buttons 5, an order receipt card having data on the kind of selected commodity, an order number or the like written and stored therein, and moreover, having a name of the selected commodity, an order number or the like printed thereon is delivered to the card sale port 6. In addition, a sale command for activating the processing/cooking unit 2 is transmitted to a central processing unit which is not shown in the drawings.

The processing/cooking unit 2 is arranged in a cooking chamber 120 located between the receiving unit 1 and a takeout unit 42 to be described later so that the customer can visually observe the interior of the cooking chamber 120 through a transparent panel 121 upright standing along the front surface of the cooking chamber 120. The processing/cooking unit 2 includes a noodle producing unit 7 serving as a foodstuff producing machine for producing wheat noodles, a noodle producing unit 8 serving as another foodstuff producing machine for producing buckwheat noodles, a noodle boiling unit 9 serving as a first cooking unit for boiling raw noodles produced in the noodle producing units 7 and 8, and a washing unit 10 serving as a second cooking unit for washing the noodles boiled in the noodle boiling unit 9 using cold water.

The noodle producing units 7 and 8 are arranged on the rear side of the noodle boiling unit 9 so that a block of plain noodle is produced by mixing flour with water by a quantity corresponding to one unit meal and the block of plain noodle is then processed in the form of longitudinally extending noodles which in turn are conveyed to the noodle boiling unit 9 via each conveyor 11.

The noodle boiling unit 9 is arranged on the front side of the noodle producing units 7 and 8 so that it can visually be observed by a customer through the transparent panel 121. The noodle boiling unit 9 includes a doughnut-shaped boiling bath 13 to be heated by an electric heater 12, and a rotary type conveying unit 15 for intermittently displacing a plurality of baskets 14 immersed in hot water in the boiling bath 14 in a suspended state by a distance corresponding to a single basket is arranged at the central part of the boiling bath 13. Longitudinally extending noodles conveyed through the conveyor 11 of the noodle producing unit 7 or 8 are introduced in each basket 14, and boiled noodles are then displaced to a predetermined receiving/delivering position where they are received and then delivered to the washing unit 10. Then, the boiled noodles are delivered to the washing unit 10 by opening a bottom portion 14a of each basket 14. The basket 14 is made of a net or a sheet material having a number of water outflow holes formed thereon so as to enable received noodles to be boiled therein, and the bottom portion 14a of the basket 14 can be opened when boiled noodles are to be discharged therethrough. It should be noted that the bottom portion 14a of the basket 14 is normally closed by the resilient force of a spring so as to prevent boiling noodles from falling down by their own dead weight. Wheat noodles or buckwheat noodles received in each basket 14 are boiled during their displacement in the boiling bath 13 as the rotary conveying unit 15 is rotationally driven. It should be noted that operative conditions such as an infeed position where wheat noodles or buckwheat noodles are introduced into each basket 14 through the conveyor 11 of the noodle producing unit 7 or 8, a time when the rotary conveying unit 15 is intermittently displaced or the like are determined such that wheat noodles or buckwheat noodles in each basket 14 are substantially completely boiled when they are displaced to the predetermined receiving/discharging position where they are received and then delivered to the washing unit 10.

Figure 3:
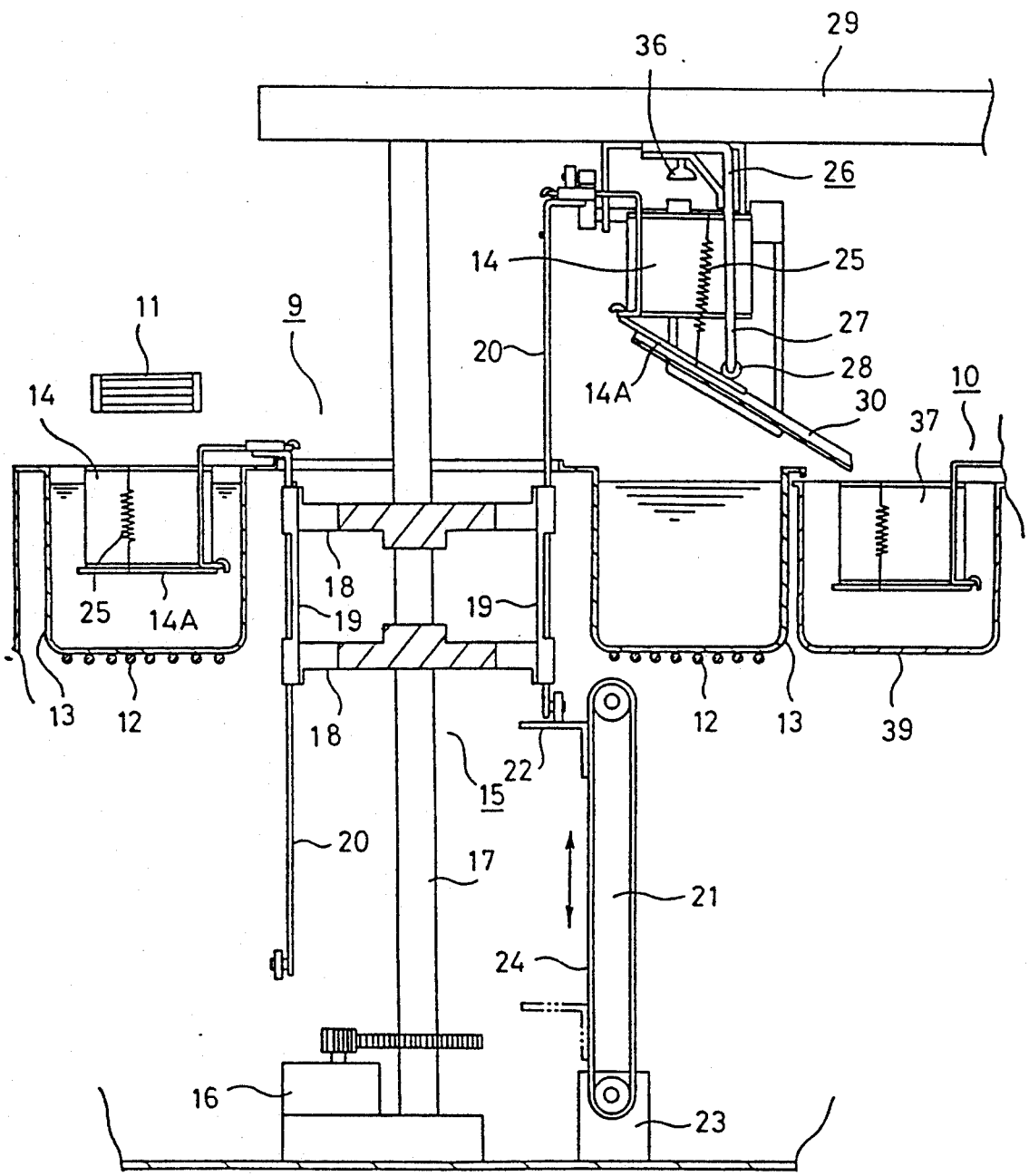
FIG. 3 is a vertical sectional front view of a noodle boiling unit in the automatic foodstuff cooking apparatus.
Figure 4:
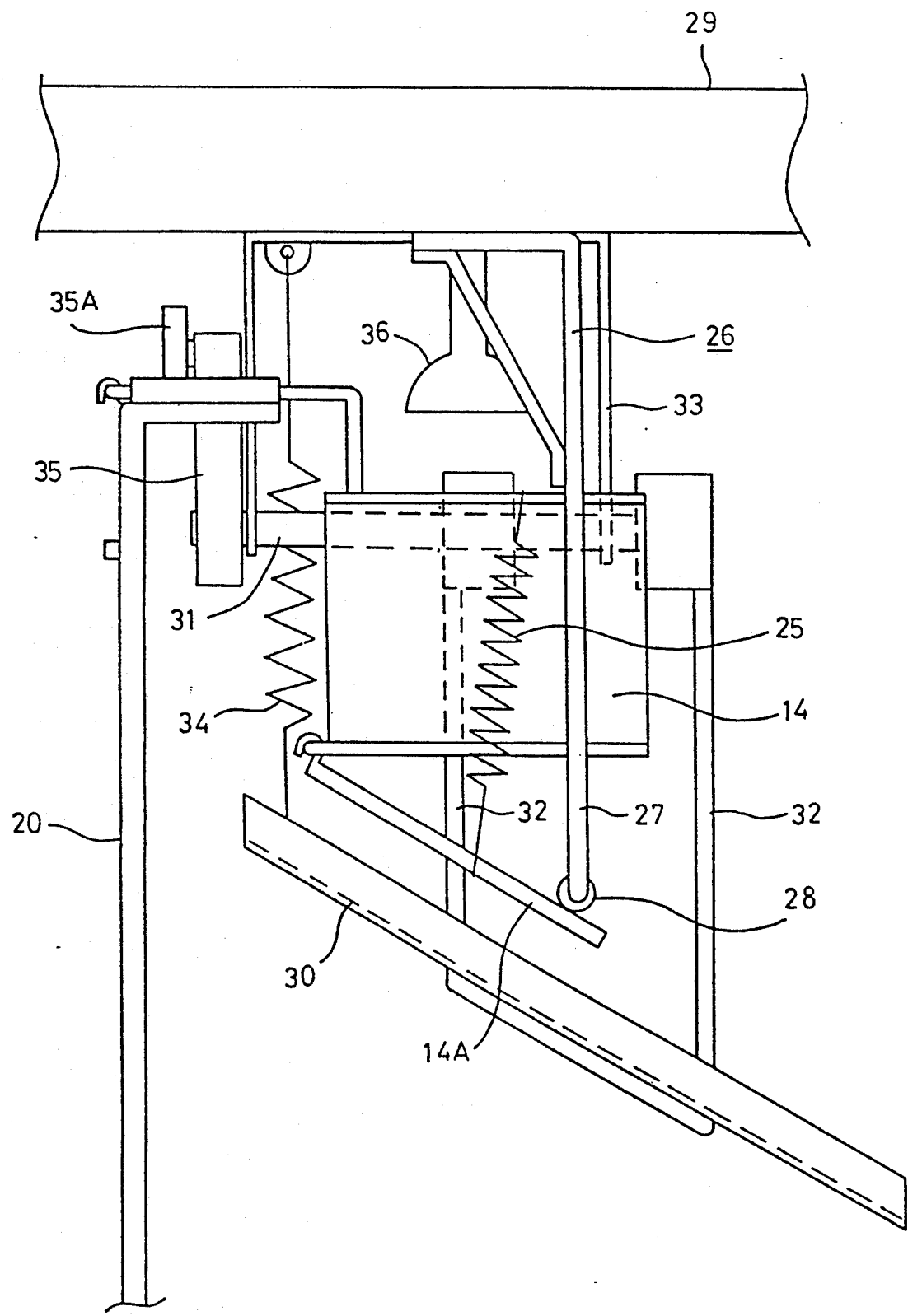
FIG. 4 is an enlarged fragmentary front view of the noodle boiling unit shown in FIG. 3, particularly illustrating actuation of the bottom portion of a basket in the noodle boiling unit.
Figure 5:
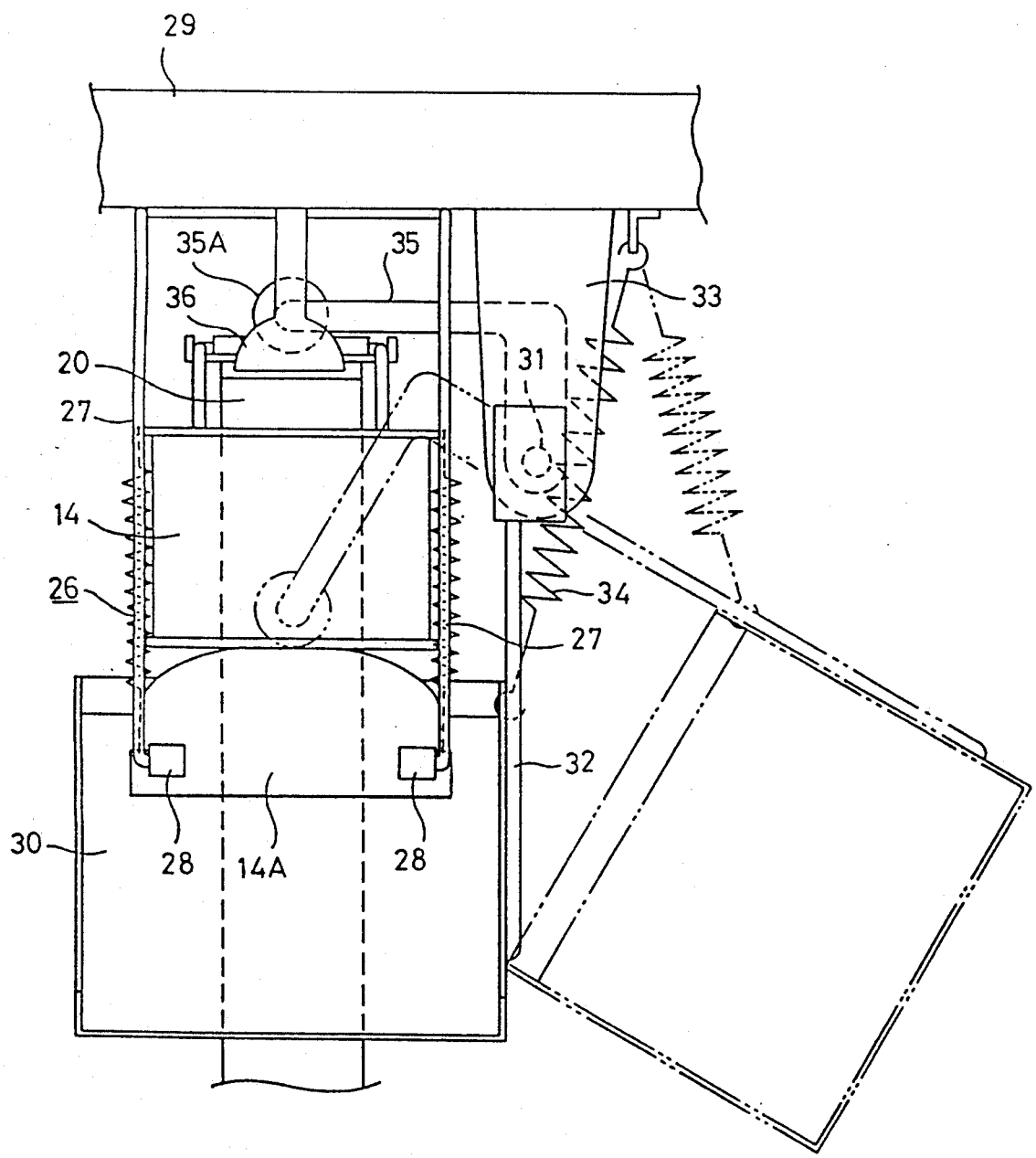
FIG. 5 is an enlarged fragmentary side view of the noodle boiling unit shown in FIG. 4.

As shown in FIG. 3, the rotary conveying unit 15 includes a rotational shaft 17 of which lower end is operatively connected to a driving motor 16 of which intermittent driving operation is properly controlled. A plurality of radially extending upper and lower arms 18 are arranged in the equally spaced relation in the central region of the rotational shaft 17 as seen in the vertical direction in the drawing, and support members 19 are vertically bridged between the upper and lower arms 18. Each support member 19 is vertically displaceably provided with a support rod 20 which supports a basket 14 in a suspended state at its upper end. Usually, each support rod 20 is lowered to a lower end by its own dead weight as well as a dead weight of the basket 14.

In FIG. 3, reference numeral 21 designates an elevator unit which is operatively engaged with the lower end of one of the support rods 20 so as to raise up each support rod 20 to a predetermined position. When the basket 14 having boiled noodles received therein is discharged to the receiving/discharging position where the boiled noodles are received and delivered to the washing unit 10, a raising-up piece 22 of the elevator unit 21 is brought in engagement with the lower end of one of the support rods 20 so as to raise up the support rod 20. Thereafter, the raising-up piece 22 is lowered to resume the original position.

Specifically, the raising-up piece 22 is fixedly secured to an endless chain 24 of the elevator unit 21 adapted to be recirculated by a reversible driving motor 23, and when the basket 14 is displaced to the foregoing receiving/discharging position, the driving motor 23 is rotated in the normal direction thereby to raise up the support rod 20 to a predetermined position. Thereafter, when the driving motor 23 is driven in the reverse direction, the support rod 20 is lowered to the lower position again to resume the original position.

Reference numeral 26 designates a thrust unit which is arranged above the basket 14 located at the receiving-/discharging position. The thrust unit 26 includes a thrust rod 27 of which upper end is fixedly secured to a horizontally extending mounting base 29 and a thrust roller 28 disposed at the lower end of the thrust rod 27. When the thrust roller 28 is brought in contact with a bottom portion 14A of the basket 14 which has been raised up by the elevator unit 21, the bottom portion 14A of the basket 14 is opened by the thrust roller 28.

Specifically, when the basket 14 is raised up by the elevator unit 21, the thrust roller 28 is brought in contact with the upper surface of the bottom portion 14A of the basket 14 in the course of upward displacement of the basket 14 so that the bottom portion 14A of the basket 14 is squeezed in the downward direction to assume a tilted state. Subsequently, when the basket 14 reaches a predetermined upper position, the bottom portion 14A of the basket 14 is fully opened so as to enable the noodles received in the basket 14 to be discharged through the bottom portion 14A of the basket 14.

The noodles received in the basket 14 slidably moves down along the tilted bottom portion 14A so that they are discharged onto a discharge chute 30 located below the bottom portion 14A of the basket 14. Then, the noodles are conveyed via the discharge chute 30 to the washing unit 10 which serves as a subsequent cooking step.

The discharge chute 30 is fixedly secured to the lower end of a mounting rod 32 of which upper end is jointed to a support shaft 31 in a suspended state so that it is turnably supported to turn about the support shaft 31 in the forward/rearward direction at the position located below the basket 14 which has been raised up by the elevator unit 21.

In other words, the discharge chute 30 is turnably supported in a suspended state to turn about the support shaft 31 which is rotatably held by a mounting member 33 fixedly secured to the lower surface of the mounting base 29.

It should be noted that the discharge chute 30 is normally located at the retracted position away from a vertically extending movement passage of the basket 14 adapted to be vertically displaced by the elevator unit 21, with the aid of the resilient force of a spring 34 of which one end is jointed to the discharge chute 30 and of which other end is jointed to the mounting base 29, so as not to obstruct movement of the basket 14 in the upward/downward direction.

In addition, a movable arm 35 is disposed at one end of the support shaft 31, and a rotary roller 35A adapted to come in contact with the upper end of the support rod 20 raised up by the elevator unit 21 is disposed at one end of the movable arm 35. As the support rod 20 is raised up by the elevator unit 21, the upper end of the support rod 20 is brought in contact with the rotary roller 35A thereby to raise up the same, whereby the discharge chute 30 is displaced within the vertically extending passage of the basket 14 to assume the position below the basket 14 which has been raised up by the elevator unit 21.

When the basket 14 having boiled noodles received therein is raised up by the elevator unit 21 and the bottom portion 14A of the basket 14 reaches the position where the thrust unit 26 starts a thrusting operation, a water spray shower 36 starts a water spraying operation so as to allow water to be sprayed toward the bottom portion 14A of the basket 14. The water spraying operation makes it easy to discharge boiled noodles toward the washing unit 10 and wash the upper surface of the bottom portion 14A of the basket 14 after the boiled noodles are discharged therefrom. When the basket 14 is lowered to the position where the bottom portion 14A of the basket 14 is closed, the water spraying operation is stopped.

As the support rod 20 is raised up by the elevator unit 21 in the above-described manner, the movable arm 35 is turned such that the discharge chute 30 is displaced to the position located below the basket 14 which has been raised up by the elevator unit 21, the bottom portion 14A of the basket 14 is opened by the thrust unit 26, boiled noodles received in the basket 14 are then discharged onto the discharge chute 30 from the bottom portion 14A of the basket 14 while a discharging operation is promoted as water is sprayed from the water spray shower 36, and finally, the boiled noodles are discharged into a basket 37 of the washing unit 10.

The washing unit 30 is arranged on the takeout unit 42 side of the boiling unit 9 in parallel with the same at the position located on the front surface side of the cooking chamber 120 so that a customer can visually observe the washing unit 10 through the transparent panel 121. As shown in FIG. 3, the washing unit 10 is constructed such that a plurality of baskets 37 are arranged in the washing unit 10 in a suspended state and a rotary conveying unit 38 adapted to intermittently displace the baskets 37 by a distance equal to a pitch between adjacent baskets 37 is arranged at the central part of a washing bath 39 so as to rotationally drive each basket 37 in synchronization with actuation of the conveying unit 15 for the boiling unit 9. Boiled noodles received in a certain basket 37 from the basket 14 at the receiving/discharging position of the boiling unit 9 are washed by cool water sprayed from a water washing shower 40 in the course of a conveying operation of the conveying unit 38. After completion of the washing operation, a bottom portion 37A of the basket 37 is opened so that washed noodles are discharged into one of bowls A arranged in a boiled noodle receiving bowl delivering unit 41.

Figure 6:
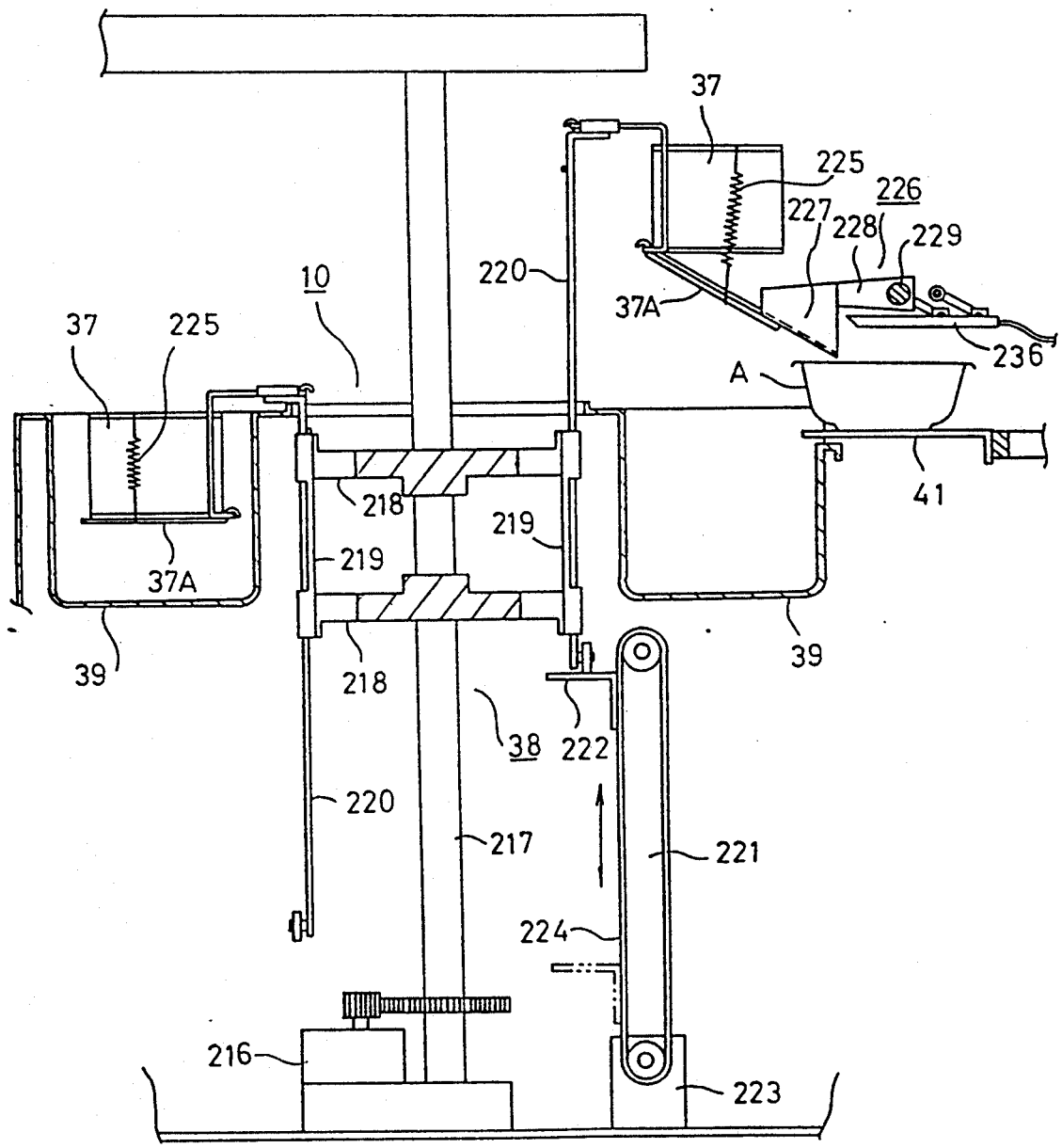
FIG. 6 is a vertical sectional front view of a washing unit in the automatic foodstuff cooking apparatus.

As shown in FIG. 6, the conveying unit 38 is provided with a rotational shaft 217 of which lower end is operatively connected to a driving motor 216 of which intermittent driving is controlled properly. A plurality of outwardly radially extending upper and lower arms 218 are arranged in the equally spaced relationship in the intermediate region of the rotational shaft 217 as seen in the vertical direction in the drawing. In addition, a plurality of supports members 219 are vertically bridged between the upper and lower arms 218. A support rod 220 having each basket 37 secured thereto in a suspended state at its upper end is vertically displaceably supported by the support member 219. Each support rod 220 is normally held at the lower end position by the dead weight of the support rod 220 as well as the dead weight of the basket 37 which is supported in a washing bath 39 in a suspended state.

In FIG. 6, reference numeral 221 designates an elevator unit which is operatively engaged with the lower end of a certain support rod 220 for raising up the support rod 220 to a predetermined position. When a basket 37 having boiled noodles received therein is displaced to a predetermined receiving/delivering position where the boiled noodles are discharged to the bowl delivering unit 41, a raising-up piece 222 on the elevator unit 221 comes in engagement with the lower end of a certain support rod 220 thereby to raise up the support rod 220 to a predetermined position. After boiled noodles received in the basket 37 are discharged into a bowl A, the support rod 220 is lowered to resume the original position.

Specifically, the raising-up piece 222 is fixedly secured to an endless chain 224 of the elevator unit 221 adapted to be recirculated by a reversible motor 223. When the basket 37 is displaced to the receiving/discharging position, the driving motor 223 is rotationally driven in the normal direction thereby to raise up the support rod 220 to a predetermined position. Thereafter, the driving motor 223 is driven in the reverse direction until the support rod 220 is lowered to the lower position again to resume the original position.

Each basket 37 is made of a net or a sheet material having a number of water outflow holes formed thereon so as to enable boiled noodles received in the basket 37 to be washed. In addition, to enable noodles to be discharged through a bottom portion 37A of the basket 37, the bottom portion 37A of the basket 37 is designed so as to be opened or closed. Additionally, the bottom portion 37A of the basket 37 is normally kept closed by the resilient force of springs 225 so as not to allow noodles in the basket 37 to fall down therethrough.

With this construction, boiled noodles in a certain basket 14 of the boiling unit 9 are received in a certain basket 37 of the washing unit 10 and the boiled noodles in the basket 37 are then washed by cooling water sprayed from the water washing shower 40 in the course of conveyance carried out by the conveying unit 38. When the noodles are conveyed to the receiving/discharging position relative to the bowl delivering unit 41, the basket 37 is raised up to an upper position by actuating the elevator unit 221.

In FIG. 6, reference numeral 226 designates an opening/closing mechanism which is arranged corresponding to the basket 37 located at the receiving/discharging position of the washing unit 10. The opening/closing mechanism 226 opens the bottom portion 37A of the basket 37 raised up by the elevator unit 221 by depressing the bottom portion 37A of the basket 37 therewith.

Specifically, the opening/closing mechanism 226 serves to open the bottom portion 37A of the basket 37 by depressing it from above, and includes a discharging chute 227 for receiving boiled noodles from the bottom portion 37A of the basket 37 and then discharge them into a bowl A on the bowl delivering unit 41 and a support arm 228 fixedly secured to a driving shaft 229 while holding the discharge chute 227.

The driving shaft 229 is rotatably supported while extending in the horizontal direction, and a driving arm 230 is arranged in parallel with the support arm 228 immovably held corresponding to the basket 37 located at the receiving/delivering position. One end of a connecting rod 231 is operatively connected to one end of the driving arm 230. Opposite end of the connecting rod 231 is operatively connected to a rotary plate 233 which is rotated by a driving motor 233 Thus, the driving shaft 229 is reciprocably rotated at every time when the rotary plate 233 is rotated by one revolution, whereby the discharge chute 227 is reciprocably vertically turned about the driving shaft 229 so as to open or close the bottom portion 37A of the basket 37.

Specifically, the driving arm 230 is mounted on the driving shaft 229 in parallel with the support arm 228 which supports the discharge chute 227, and the right-hand end of the driving arm 230 is turnably connected to the upper end of the connecting rod 231. In addition, the lower end of the connecting rod 231 is operatively connected to the rotary plate 233 of which center is operatively connected to the driving motor 232, at the position located outside of the center of the rotary plate 233. Thus, when the connecting rod 231 is displaced in the downward direction by rotation of the driving motor 232 by one revolution, the bottom portion 37A of the basket 37 is turned to reach the opened position where the bottom plate 37A of the basket 37 is opened in the downwardly tilted state, from the waiting position where the discharge chute 227 is displaced in the upward direction and vice versa.

The rotary plate 233 is provided with a control portion 234 which is formed by cutting off a part of the outer circular periphery thereof. In addition, a detecting switch 235 is disposed opposite to the outer periphery of the rotary plate 233 so as to detect rotation of the rotary disc 233 by one revolution, whereby rotation of the driving motor 232 is stopped by actuation of the detecting switch 235 at every time when the rotary plate 233 is rotated by one revolution.

Figure 7:
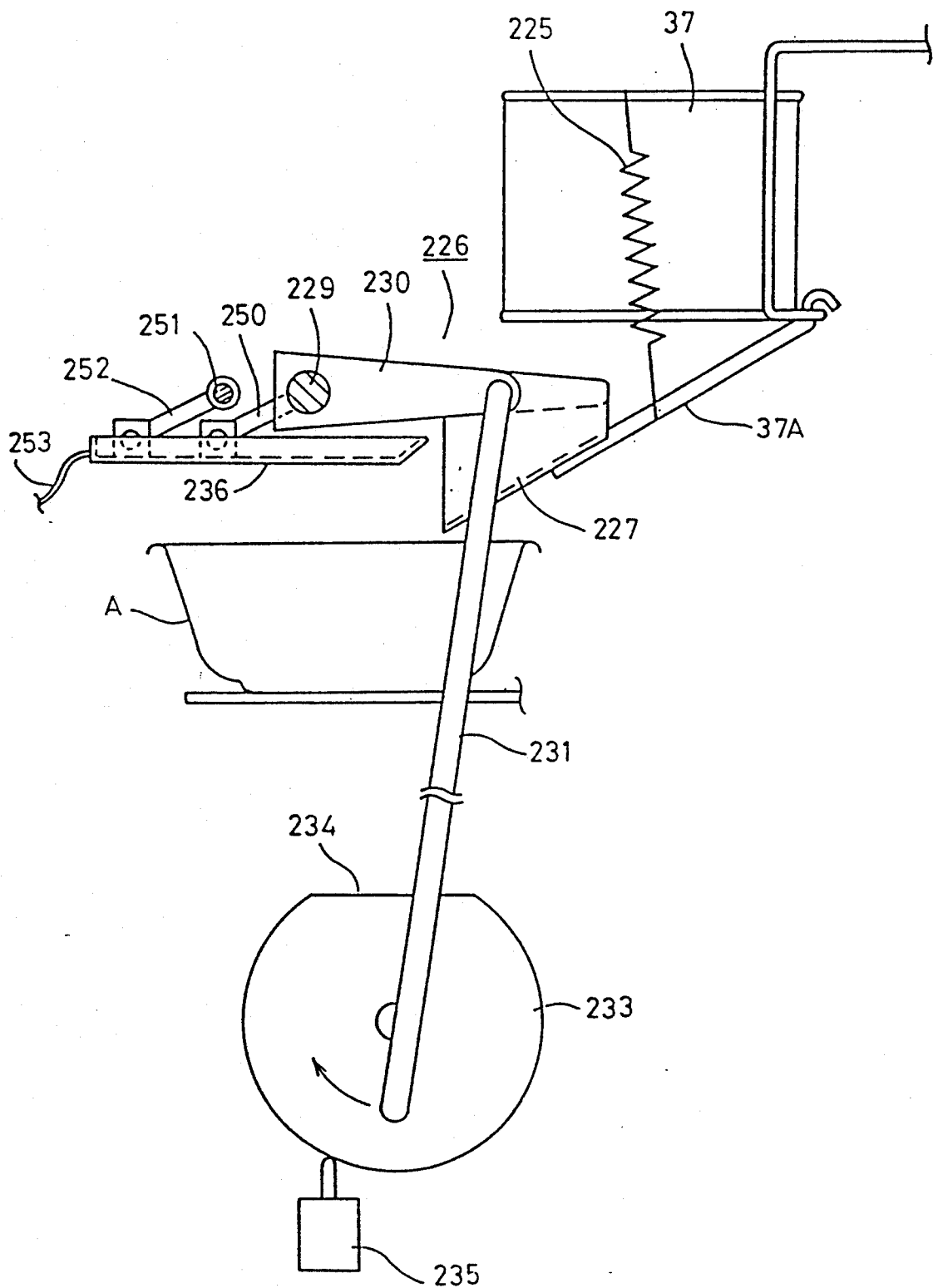
FIG. 7 is an enlarged front view of an opening/closing mechanism operatively associated with the washing unit, particularly illustrating that the bottom portion of one of baskets arranged in the washing unit is opened.
Figure 8:
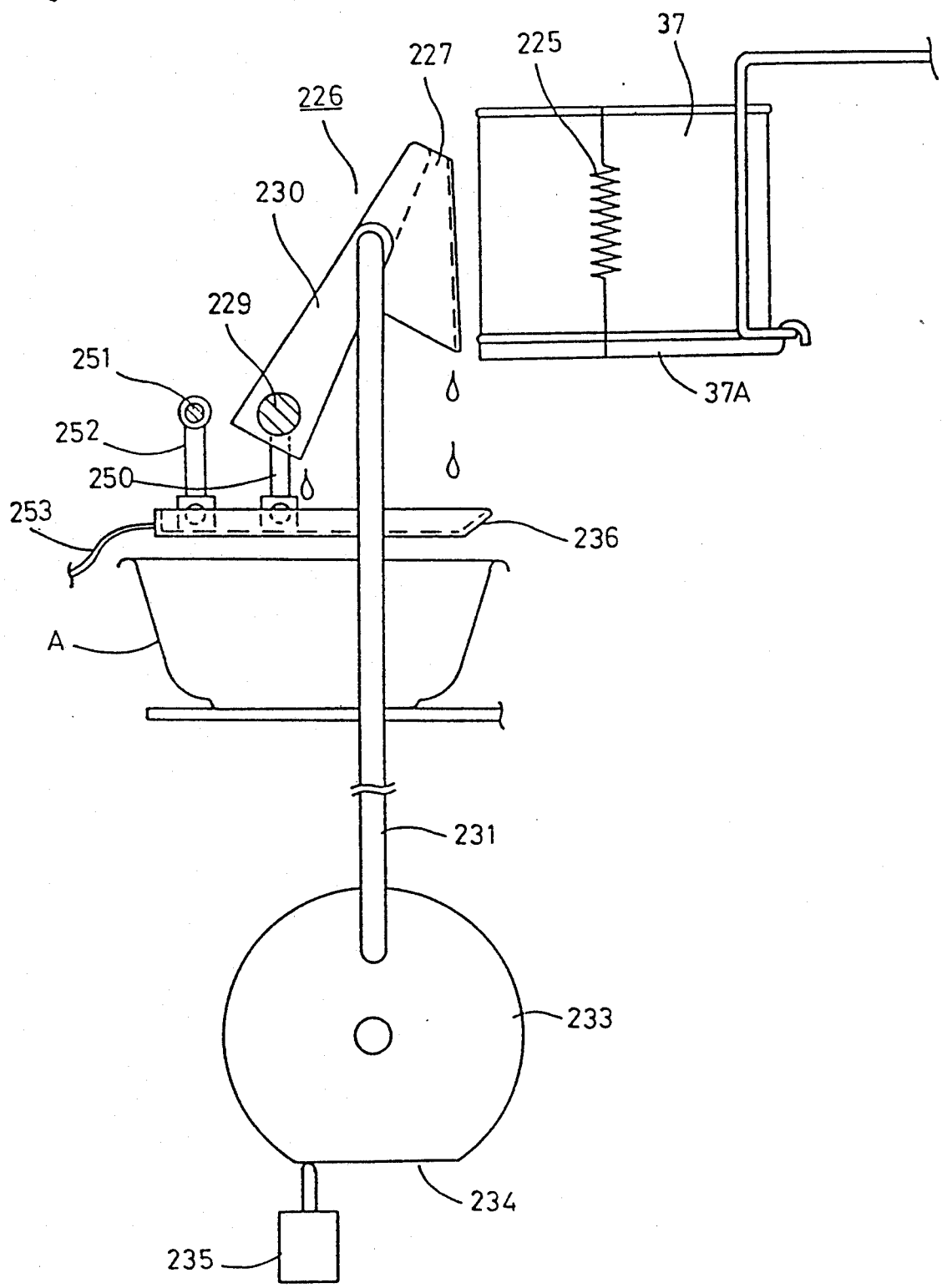
FIG. 8 is an enlarged front view of the opening/closing mechanism shown in FIG. 7, particularly illustrating an operative state of the same when the automatic noodle cooking apparatus is held in the sale waiting state.
Figure 9:
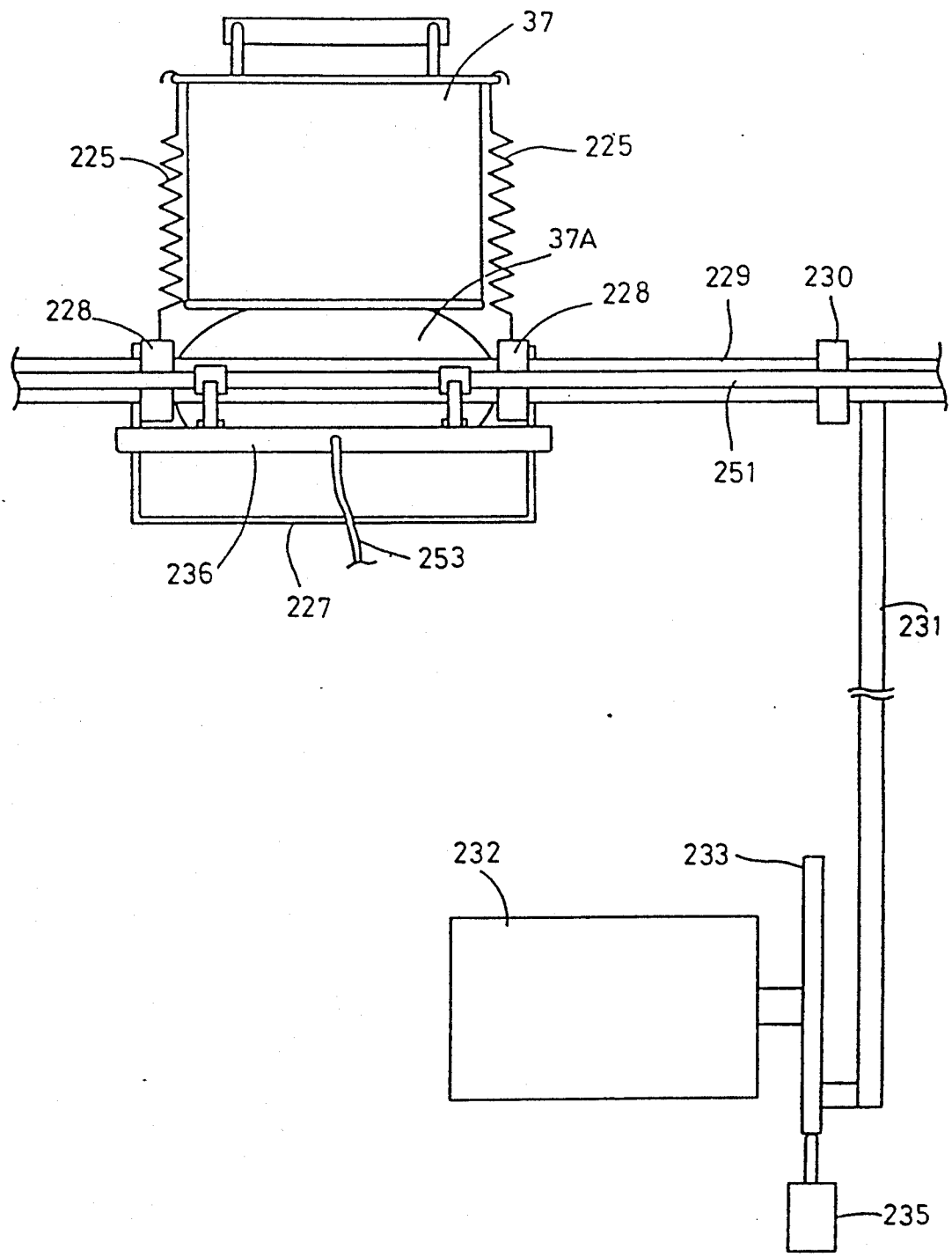
FIG. 9 is a side view of the opening/closing mechanism shown in FIG. 7.
Figure 10:
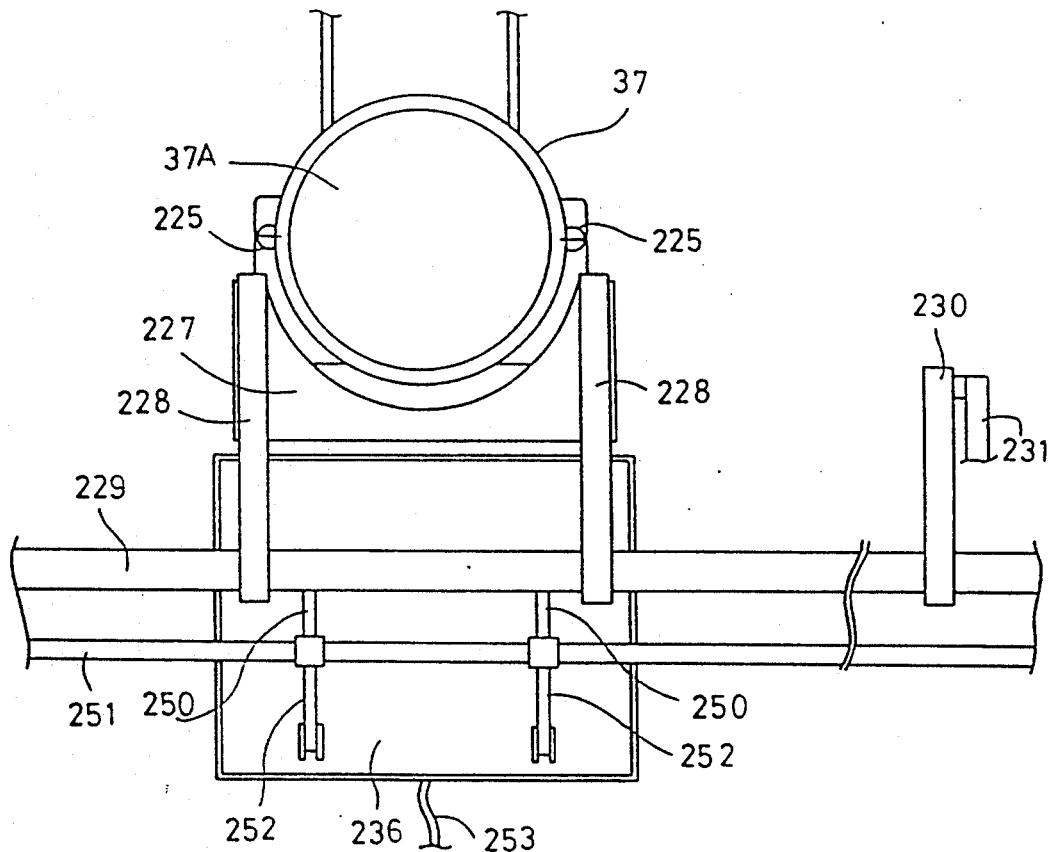
FIG. 10 is a plan view of the opening/closing mechanism shown in FIG. 7.

In FIG. 7, reference numeral 236 designates a receiving tray member for receiving water drops falling down from the opening/closing mechanism 226. The lower end of a suspending rod 250 extending from the driving shaft 229 and the lower end of a following rod 252 of which upper end is rotatably supported by a support shaft 251 are turnably connected to the receiving tray member 236 in such a manner that the suspending rod 250 and the following rod 252 extend in parallel with each other, and moreover, the receiving tray member 236 extends in the substantially horizontal direction in a suspended state.

While the receiving tray member 236 is held at the waiting position where the discharging chute 227 of the opening/closing mechanism 226 is located at the upper position, it extends in the substantially horizontal direction on the lower side of the discharge chute 227 and the support arm 228, i.e., on the lower side of the opening/closing mechanism 226 so as to enable water drops adhering to the discharge chute 227 and the support arm 228 to be received in the receiving tray member 236. In addition, while the bottom portion 37A of the basket 37 is opened by the discharge chute 227, the receiving tray member 236 is retracted away from the position below the discharge chute 227 and extends in the substantially horizontal direction so that a discharging operation for the boiled noodles to be received in one of bowls A arranged on the bowl delivering unit 41, via the bottom portion 37A of the basket 37 and the discharge chute 227 is not obstructed any longer.

Additionally, the receiving tray member 236 is provided with a water drain tube 253 through which water drops which fall down from the opening/closing mechanism 226 are drained therethrough.

Next, actuation of the discharge chute 227 to be performed at the receiving/discharging position will be described below. When a certain basket 37 is conveyed to the receiving/discharging position relative to the bowl delivering unit 41, it is raised up to the upper position by actuating the elevator unit 221, and the foregoing upper position is maintained when actuation of the elevator unit 221 is stopped.

While the basket 37 is located at the upper position, the rotary plate 233 is rotated by the driving motor 232 by one revolution which is detected by the detecting switch 235 thereby to stop rotation of the driving motor 232. When the rotary plate 233 is rotated by one revolution, the discharge chute 227 is turnably displaced from the upper waiting position to the lower operative position, causing the bottom portion 37A of the basket 37 to be depressed by the discharge chute 227 so as to allow it to be opened. At this time, the receiving tray member 236 is retracted away from the operative position below the discharge chute 227 in operative association with the discharge chute 227. Then, boiled noodles received on the bottom portion 37A of the basket 37 are discharged into one of bowls A arranged on the bowl delivering unit 41.

Thereafter, the discharge chute 227 is turnably restored to the upper position, and the bottom portion 37A of the basket 37 is restored to the closed state by the resilient force of the spring 225. At this time, the receiving tray member 236 is displaced to the position below the discharge chute 227 and the support arm 228 to resume the operative state. Thus, water drops flowing from the bottom portion 37A of the basket 37 and boiled noodles and adhering to the discharge chute 227 and the support arm 228 fall down in the receiving tray member 36 and are then drained through the water drain tube 253 without any possibility that they fall down in the bowl A located below the receiving tray member 236.

Once the discharge chute 227 is restored to the waiting position, the driving motor 223 for the elevator unit 221 is rotated in the reverse direction so that the basket 37 is restored to the lower position.

It should be noted that displacement of the basket 37 in the upward/downward direction with the aid of the elevator unit 221 as well as an opening/closing operation of the bottom portion 37A of the basket 37 with the aid of the opening/closing mechanism 226 are achieved while actuation of the conveying unit 38 for intermittently displacing the baskets 37 is stopped.

The bowl delivering unit 41 is arranged between the washing unit 10 and the takeout unit 42 so that a customer can visually observe the bowl delivering unit 41 from the front surface side through the transparent panel 121. The bowl delivering unit 41 serves to deliver one of bowls A corresponding to the kind of noodles discharged from the basket 37 in the washing unit 10 and then convey the bowl A having the noodles received therein to a stocker unit 43 arranged behind the takeout unit 42.

The takeout unit 42 is constructed such that order numbers indicative of a plurality of kinds of noodles received in the stocker unit 43 are indicated on a display instrument 44 and, when it is informed that an order card is inserted through a card insert slit 45, one of bowls A reserved in the stocker unit 43 having a certain kind of noodles received therein corresponding to the customer's requirement is delivered to a bowl takeout port 46 while a noodle soup is supplied into the bowl A from a noodle soup supply unit 47.

On the other hand, an air duct 50 is arranged above the boiling unit 9 so as to recover steam generated from noodles in the noodle boiling bath 13 and then exhaust it outside of the cooking chamber 20. In addition, an air blowing slit 51 is formed along the lower edge of the transparent panel 121 on the rear side of the same so as to blow air toward the rear surface of the transparent panel 121 through the air blowing slit 51 thereby to form an air curtain along the rear surface of the transparent panel 121 while preventing steam from adhering thereto.

Figure 11:
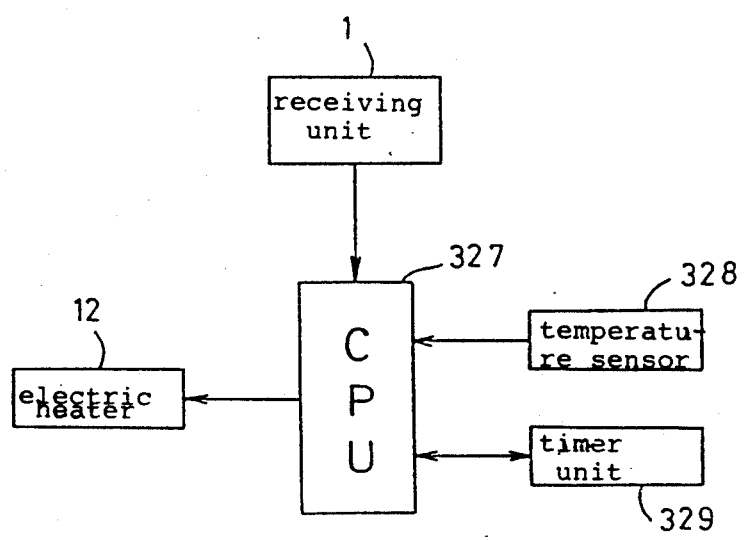
FIG. 11 is a block diagram which schematically illustrates the structure of a controlling unit for properly controlling a temperature of boiling water for boiling noodles produced in one of noodle producing units.

As shown in FIG. 11, the noodle boiling unit 9 is equipped with a central processing unit (hereinafter referred to as a CPU) 327 to serve as a controller for controlling a temperature of boiling water in the noodle boiling bath 13. The CPU 327 controls an electric heater 12 for heating boiling water for noodles to be boiled, a temperature sensor 328 for detecting a temperature of the boiling water in the boiling water bath 13 and a timer unit 329, and the receiving unit 1 is electrically connected to the CPU 327 so that the CPU 327 performs a controlling operation in accordance with the program which has been programmed in the ROM.

While the automatic noodle cooking apparatus of the present invention is held in the sale waiting state, the CPU 327 controls the electric heater 12 so as to hold a temperature of boiling water in the boiling water bath 13 within the range of the warming-up temperature lower than the boiling temperature of hot water by a predetermined quantity of temperature in response to a temperature signal from the temperature sensor 328. When a sale command is transmitted to the CPU 327 in response to actuation of the receiving unit 1 induced by a customer's commodity purchasing operation, the electric heater 12 is activated to exhibit a maximum output so that the present noodle boiling temperature is quickly raised up to the boiling temperature of hot water, and moreover, the timer unit 329 is reset to start a time measuring operation. When a time-up signal from the timer unit 329 is inputted into the CPU 327 after a predetermined period of time long enough to boil noodles in a certain basket 14 elapses, the CPU 327 controls the electric heater 12 for reducing an output from the electric heater 12 so as to allow the automatic noodle cooking apparatus to be held in the sale waiting time state and maintain the temperature of the noodle boiling water in the noodle boiling bath 13 within the range of the warming-up temperature.

It should be noted that it is preferable that the range of the warming-up temperature is determined such that hot water for boiling noodles is heated up to the noodle boiling temperature within a short period of time. However, since about 20 seconds are required to elapse from the time when a sale command is transmitted from the receiving unit 1, in order to discharge longitudinally extending noodles from each of the noodle producing units 7 and 8 via each conveyor 11, it is more preferable to select an electric heater 12 which assures that the noodle boiling water can be heated up to the boiling temperature of hot water within a period of about 20 seconds, and moreover, selectively determine the range of a warming-up temperature of hot water in the noodle boiling bath 13 in consideration of the foregoing time. In view of the aforementioned facts, according to the embodiment of the present invention, the range of a warming-up temperature of hot water in the noodle boiling bath 13 is predetermined within the narrow range of 96° C. to 97° C.

Figure 12:
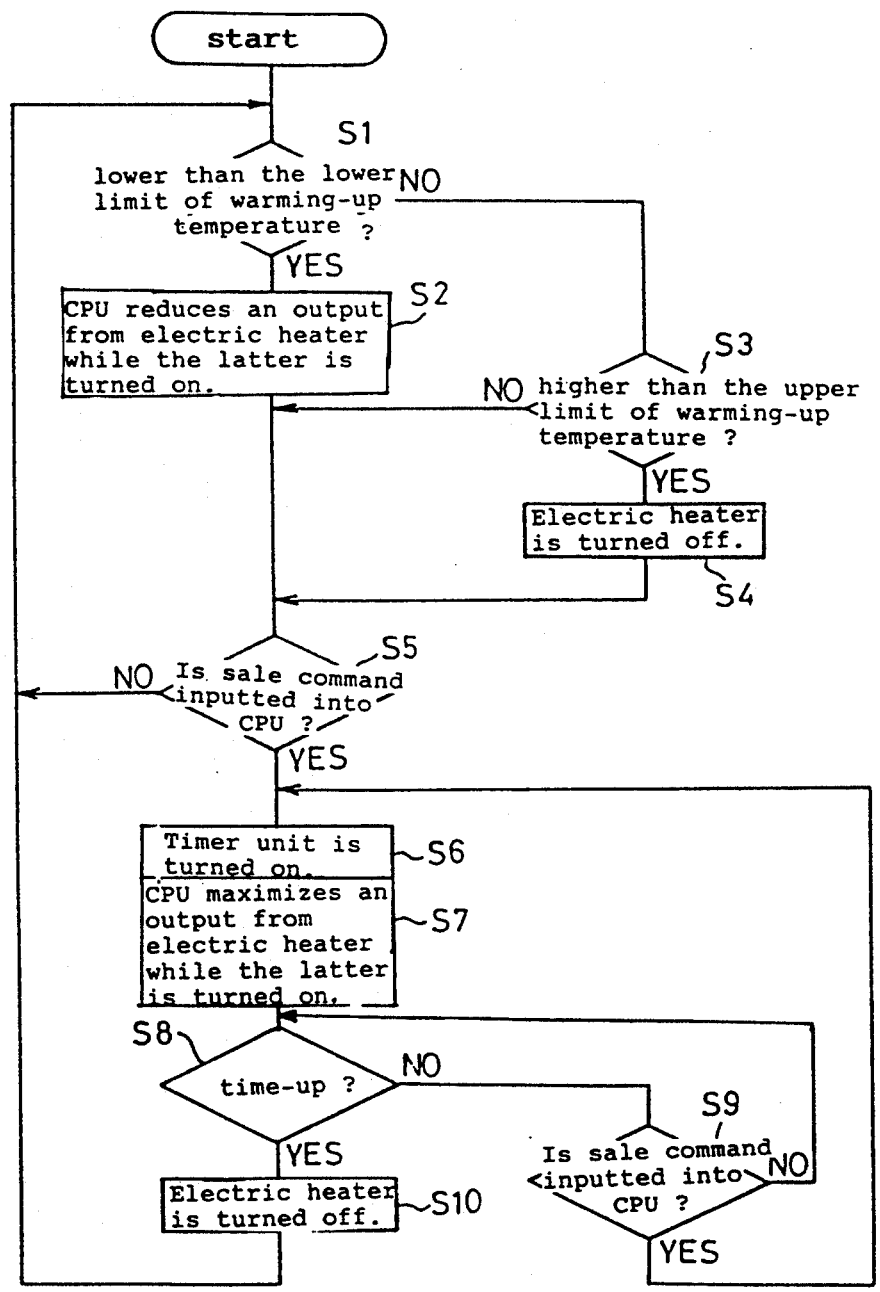
FIG. 12 is a flowchart which schematically illustrates a series of controlling operations to be performed by the control unit shown in FIG. 11.

FIG. 12 is a flowchart which schematically illustrates a series of controlling operations to be performed by the CPU 327 shown in FIG. 11. When the CPU 327 starts a controlling operation, the program enters a step S1 at which the CPU 327 determines in response to a temperature signal from the temperature sensor 328 inputted thereinto whether the present noodle boiling temperature is lower than the lower limit of the range of a warming-up temperature or not. When it is found at the step S1 that it is lower than the lower limit of the same, the program goes to a step S2 at which the CPU 327 reduces an output from the electric heater 12 while the latter is turned on. On the contrary, when it is found at the step S1 that the present noodle boiling temperature is higher than the lower limit of the range of a warming-up temperature, the program goes sidewards to a step S3.

At the step S3, the CPU 327 determines in response to a temperature signal from the temperature sensor 328 inputted thereinto whether the present boiling temperature is higher than the upper limit of a warming-up temperature or not. It is found at the step S3 that it is higher than the upper limit of the same, the program goes to a step S4 at which the CPU 327 stops outputting from the electric heater 12, and then, the program goes to a step S5. On the contrary, when it is found at the step S3 that the present boiling temperature is lower than the upper limit of a warming-up temperature, the program goes to the step S5 directly from the step S3.

In a case where it is found at the step S5 that no sale command is issued from the receiving unit 1, the program returns to the step S1 at which the automatic noodle cooking apparatus of the present invention is held in the sale waiting state so as to repeatedly perform a series of operations from the step S1 to the step S5. In other words, a temperature of the noodle boiling water in the noodle boiling bath 13 is maintained within the range of a warming-up temperature by performing a series of operations from the step S1 to the step S5 again.

When a sale command is inputted into the CPU 327 from the receiving unit 1, the program goes to a step S6 at which the CPU 327 resets the timer unit 329 thereby to perform a counting operation. Subsequently, the program goes to a step S7 at which the CPU 327 maximizes an output from the electric heater 12 while the latter is turned on, and then, the program goes to a step S8. Then, at the step S8, the boiling water in the noodle boiling bath 13 is quickly heated up to a level of the boiling temperature of hot water.

In addition, at the step S8, the CPU 327 determines whether or not a time-up signal is inputted thereinto from the timer unit 329 after a predetermined time elapses. When it is found at the step S8 that it is inputted into the CPU 327, a noodle boiling operation has been terminated with the noodle boiling unit 9. Then, the program goes to a step S10 at which the electric heater 12 is turned off. Subsequently, the program returns to the step S1, whereby the automatic noodle cooking apparatus of the present invention is held in the sale waiting state.

In a case where it is found at the step S8 that no time-up signal is inputted into the CPU 327, a noodle boiling operation has been not terminated with the noodle boiling unit 9. In this case, the program goes sidewards to a step S9 at which the CPU 327 determines whether a sale command is inputted thereinto from the receiving unit 1 or not. When it is found at the step S9 that a sale command is inputted into the CPU 327, this means that a next order of noodles has been sold. Thus, the program returns to the step S6 at which the CPU 327 resets the timer unit 329 thereby to start a new counting operation.

In other words, a series of operations are performed from the step S5 at which a sale command is inputted into the CPU 327 from the receiving unit 1 from the step S8 at which a time-up signal is inputted into the CPU 327 in such a manner that longitudinally extending noodles produced in either of the noodle producing units 7 and 8 are discharged to a certain basket 14 in the noodle boiling unit 9, the noodles in the basket 14 are then boiled in the noodle boiling unit 9, and thereafter, the boiled noodles are conveyed to the receiving/discharging position from which they are conveyed further to a certain basket 37 in the washing unit 10.

Subsequently, when a next order of noodles is sold in the course of the aforementioned operations and a sale command is issued from the receiving unit 1, the sale command is inputted into the CPU 327 at the step S9, and the CPU 327 resets the timer unit 329 at the step S6 so as to allow the timer unit 329 to start a counting operation again. In other words, in a case where a plurality of sales are successively ordered, when a boiling operation for a final order of noodles to be boiled in the noodle boiling unit 9 is completed, the CPU 327 deactivates the electric heater 12, whereby the automatic noodle cooking apparatus of the present invention is held in the sale waiting state.

Since the automatic noodle cooking apparatus is constructed in the above-described manner in accordance with the embodiment of the preset invention, as long as the apparatus is held in the sale waiting state, the CPU 327 controls the electric heater 12 in response to a temperature signal from the temperature sensor 328 such that a temperature of the boiling water in the noodle boiling unit remains within the range of a warming-up temperature lower than the boiling temperature of hot water by a predetermined quantity of temperature. In addition, in response to a sale command generated by a customer's foodstuff purchasing operation, the CPU 327 controls the electric heater 12 such that the foodstuff boiling temperature is equalized to the boiling temperature of hot water during a boiling operation for a certain foodstuff. Thus, with the automatic noodle cooking apparatus of the present invention, a quantity of vaporization of the boiling water can be reduced, resulting in a quantity of the boiling water being saved. Additionally, undesirable lowering of the noodle boiling temperature due to frequent additional supplement of boiling water can be prevented. Another advantageous effect derived from the automatic noodle cooking apparatus of the present invention is that a quantity of energy consumed by the electric heater 12 can be reduced.

Since the automatic noodle cooking apparatus of the present invention is constructed in the above-described manner, a customer can visually observe the following states through the transparent panel 121, one of them being the state that longitudinally extending noodles produced in each of the noodle producing units 7 and 8 are discharged to a certain basket 14 located at a predetermined position in the noodle boiling unit 9 via each conveyor 11, other of them being the state that the noodles received in the basket 14 are boiled in the noodle boiling unit 13 in the course of intermittent conveyance of them in the noodle boiling unit 9, another one of them being the state that the noodles boiled in the noodle boiling unit 9 are washed in a certain basket 37 intermittently moving in the washing bath 39 by cooling water sprayed from the washing shower 40, and further another one of them being the state that the noodles washed by the sprayed cooling water are delivered to one of bowls A arranged in the bowl delivering unit 41. In other words, the automatic noodle cooking apparatus of the present invention is constructed such that after the customer performs a foodstuff purchasing operation at the receiving unit 1, he walks along the transparent panel 121 to successively observe a series of foodstuff processing/cooking steps in the processing-/cooking unit 2 and then reaches the takeout unit 42. Therefore, according to the present invention, since a foodstuff can automatically be produced and cooked in conformity with a customer's purchasing activity, there is no need of employing any cook, and moreover, manpower required for removing dirty dishes, bowls or the like and washing them after completion of a cooking operation can be eliminated. In addition, since a quality of processed/cooked foodstuff in the course of a series of processing/cooking steps can visually be confirmed by himself owing to construction of the automatic noodle cooking apparatus of the present invention as described manner, a final product of foodstuff can be eaten by him with excellent safety. Additional advantageous effect derived from the present invention is that the automatic noodle cooking apparatus can be designed and constructed in smaller dimensions.

Further, according to the present invention, when a certain basket 14 having a foodstuff received therein is to be displaced to a predetermined position in the course of conveyance of the foodstuff from the noodle boiling unit 9 serving as a first cooking unit to the washing unit 10 serving as a second cooking unit, first, the basket 14 is raised up by the elevator unit 21. As the basket 14 is raised up in this way, the discharge chute 30 is displaced to the position below below the basket 14 so that the thrust unit 26 opens the bottom portion 14A of the basket 14, causing the foodstuff received in the basket 14 to be discharged to the discharge chute 30 through the bottom portion 14A of the basket 14. Thereafter, the foodstuff is conveyed to a next cooking step. Thus, noodles in the basket 14 can easily be taken out therefrom without any necessity for reversing the basket 14, and moreover, the noodles can easily and reliably be conveyed to a subsequent cooking step. Thus, another advantageous effect derived from the present invention is that the automatic noodle cooking apparatus can be mechanized easily.

In addition, according to the present invention, another advantageous effect is that when a foodstuff is to be conveyed from the washing unit 10 serving as a second cooking unit to the bowl delivering unit 41, noodles received in a certain basket 37 can easily and reliably be discharged to one of bowls A without any necessity for reversing the bowl A, causing the automatic noodle cooking apparatus to be easily mechanized while preventing undesirable invasion of water drops or similar foreign materials into the interior of each bowl A in the presence of the receiving tray member 236.

Additionally, according to the present invention, while the automatic noodle cooking apparatus is held in the sale waiting state, the CPU 327 controls the electric heater 12 in response to a temperature signal from the temperature sensor 328 such that a temperature of boiling water in the noodle boiling bath 13 is maintained within the range of a warming-up temperature lower than the boiling temperature of hot water by a predetermined quantity of temperature. In addition, the CPU 327 controls the electric heater 12 in response to a sale command generated by a customer's purchasing operation such that the foodstuff boiling temperature is equalized to the boiling temperature of hot water during a boiling operation performed for the ordered foodstuff. Consequently, a quantity of vaporization of boiling water can be saved, and moreover, a quantity of the boiling water can be reduced. Another additional advantageous effect derived from the automatic noodle cooking apparatus of the present invention is that a quantity of energy consumed by the electric heater 12 can be reduced.

INDUSTRIAL APPLICABILITY

As is apparent from the above description, the present invention has provided an automatic foodstuff cooking apparatus having advantageous effects that employment of a cook is not required for operating the automatic foodstuff cooking apparatus, manpower required for removing dirty dishes, bowls or the like after completion of a cooking operation can be eliminated, and moreover, the automatic foodstuff cooking apparatus can be designed and constructed in smaller dimensions. Thus, the automatic foodstuff cooking apparatus of the present invention is advantageously employable especially for an automatic vending machine for automatically vending cooked foodstuffs.

We claim:

1. An automatic foodstuff cooking apparatus for automatically processing and cooking a foodstuff, comprising:

a receiving unit for issuing an order card when a monetary medium is received by said receiving unit, at least one foodstuff producing unit for processing and cooking said foodstuff in operative association with actuation of said receiving unit, a first cooking unit for cooking a foodstuff produced by said foodstuff producing unit, a second cooking unit for additionally cooking said foodstuff after it is cooked in said first cooking unit, a receptacle delivering unit for delivering a receptacle so as to allow said foodstuff cooked in said second cooking unit to be received in said receptacle, a stocker unit for storing cooked foodstuffs each received in said receptacle, a takeout unit means for discharging to a takeout port a certain foodstuff corresponding to the kind of foodstuff designated by insertion of said order card while displaying preparation of foodstuffs each received in said receptacle and stored in said stocker unit, said automatic foodstuff cooking apparatus including a cooking chamber which is arranged between said receiving unit and said takeout unit, a front surface of said cooking chamber being covered with a transparent panel, said first cooking unit being located on the receiving unit side of said cooking chamber, and said second cooking unit being located on the takeout unit side of said cooking chamber, and said foodstuff producing unit being located on the rear side of said first cooking unit.

2. The apparatus of claim 1, wherein said first cooking unit includes a foodstuff discharging unit including a plurality of baskets each adapted to receive a foodstuff and then convey said foodstuff further, each of said baskets having a bottom portion which is opened when said foodstuff is to be discharged therethrough, an elevator unit for successively raising up said baskets, a forwardly/rearwardly displaceable discharge chute adapted to be displaced to a position below said basket when said basket is raised up by said elevator unit, and a thrust unit for discharging each foodstuff received in said basket by opening said bottom portion of said basket which has been raised up by said elevator unit.

3. The apparatus of claim 1, wherein said second cooking unit includes a foodstuff discharging unit including a plurality of baskets each adapted to receive a foodstuff and then convey said foodstuff further, each of said baskets having a bottom portion which is opened when said foodstuff is to be discharged therethrough, an opening/closing mechanism for opening said bottom portion of each basket, said opening/closing mechanism including a discharge chute for guiding the displacement of each foodstuff discharged from said basket to a receptacle, and a receiving tray member adapted to be displaced to a position below said discharge chute in operative association with said opening/closing mechanism, said receiving tray member being displaced away from said position below said discharge chute while said bottom portion of each basket is kept opened, and said receiving tray member being displaced to said position below said discharge chute to receive therein water drops falling down from said opening/closing mechanism while said automatic foodstuff cooking apparatus is held in the sale waiting state.

4. The automatic foodstuff cooking apparatus of claim 1, wherein said first control unit includes a foodstuff boiling bath, a boiling temperature controlling unit which includes a heating unit for heating boiling water in said boiling bath, a temperature sensor for detecting a temperature of said boiling water in said foodstuff boiling bath, and a controlling unit for controlling said heating unit so as to allow said heating unit to operate properly, wherein a controlling operation is performed by said controlling unit such that said heating unit is controlled so as to allow a temperature of said boiling water in said boiling water bath to remain within the range of a warming up temperature lower than a boiling temperature of hot water in said boiling water bath by a predetermined quantity of temperature in response to a temperature signal from said temperature sensor while said automatic foodstuff cooking apparatus is held in the sale waiting state, and moreover, said heating unit is controlled so as to allow a temperature of said boiling water in said boiling water bath to be equalized to said boiling temperature of hot water during a foodstuff boiling operation in response to a sale command generated by a customer's foodstuff purchasing operation.

* * * * *